(12) United States Patent
Huang et al.

(10) Patent No.: US 10,877,568 B2
(45) Date of Patent: Dec. 29, 2020

(54) THREE-DIMENSIONAL IN-THE-AIR FINGER MOTION BASED USER LOGIN FRAMEWORK FOR GESTURE INTERFACE

(71) Applicants: Dijiang Huang, Tempe, AZ (US); Duo Lu, Tempe, AZ (US)

(72) Inventors: Dijiang Huang, Tempe, AZ (US); Duo Lu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 16/715,059

(22) Filed: Dec. 16, 2019

(65) Prior Publication Data

US 2020/0201443 A1 Jun. 25, 2020

Related U.S. Application Data

(60) Provisional application No. 62/782,100, filed on Dec. 19, 2018.

(51) Int. Cl.
| | |
|---|---|
| *G06F 3/01* | (2006.01) |
| *G06N 3/04* | (2006.01) |
| *G06K 9/46* | (2006.01) |
| *G06N 3/08* | (2006.01) |
| *G06F 21/31* | (2013.01) |
| *G06K 9/00* | (2006.01) |

(52) U.S. Cl.
CPC ........... *G06F 3/017* (2013.01); *G06K 9/4628* (2013.01); *G06N 3/0454* (2013.01); *G06N 3/08* (2013.01); *G06T 2207/20081* (2013.01); *G06T 2207/20084* (2013.01)

(58) Field of Classification Search
USPC ........................................................ 345/156
See application file for complete search history.

(56) References Cited

U.S. PATENT DOCUMENTS

| | | | | |
|---|---|---|---|---|
| 5,781,662 | A * | 7/1998 | Mori ................... | G06F 3/04883 382/189 |
| 8,837,738 | B2 | 9/2014 | Huang et al. | |
| 9,104,271 | B1 * | 8/2015 | Adams .................... | G06F 3/014 |
| 9,160,761 | B2 | 10/2015 | Lee et al. | |
| 9,355,236 | B1 * | 5/2016 | Kratz ....................... | G06F 21/31 |
| 9,357,331 | B2 | 5/2016 | Huang | |
| 9,705,850 | B2 | 7/2017 | Huang et al. | |
| 10,419,404 | B2 | 9/2019 | Huang et al. | |
| 10,425,411 | B2 | 9/2019 | Huang | |
| 2007/0041058 | A1 * | 2/2007 | Disatnik ............... | G06F 3/0346 358/486 |

(Continued)

FOREIGN PATENT DOCUMENTS

WO 2014160479 A1 10/2014

OTHER PUBLICATIONS

L. Liu, L. Shao, F. Shen, and M. Yu. Discretely coding semantic rank orders for supervised image hashing. In The IEEE Conference on Computer Vision and Pattern Recognition (CVPR), Jul. 2017.

(Continued)

*Primary Examiner* — Chineyere D Wills-Burns
(74) *Attorney, Agent, or Firm* — Polsinelli PC

(57) ABSTRACT

Various embodiments for a three-dimensional in-the-air finger motion based user login framework for gesture interface are disclosed.

20 Claims, 7 Drawing Sheets

(56) References Cited

U.S. PATENT DOCUMENTS

| | | | |
|---|---|---|---|
| 2009/0052785 A1* | 2/2009 | Shamaie | G06K 9/00355 382/209 |
| 2011/0041100 A1* | 2/2011 | Boillot | G06F 3/011 715/863 |
| 2013/0004016 A1* | 1/2013 | Karakotsios | G06K 9/00288 382/103 |
| 2013/0148024 A1* | 6/2013 | Shin | H04N 21/441 348/552 |
| 2014/0184496 A1* | 7/2014 | Gribetz | G02B 27/017 345/156 |
| 2014/0267009 A1* | 9/2014 | DeLean | G06F 3/017 345/156 |
| 2014/0282273 A1* | 9/2014 | Anderson | G06F 3/017 715/863 |
| 2015/0193656 A1* | 7/2015 | Kounavis | G06K 9/44 382/165 |
| 2015/0261301 A1* | 9/2015 | Hagiwara | G06F 40/53 715/268 |
| 2016/0147307 A1* | 5/2016 | Masuko | G06F 40/186 715/863 |
| 2016/0241399 A1 | 8/2016 | Huang et al. | |
| 2016/0292410 A1* | 10/2016 | Lu | G06F 21/32 |
| 2018/0115470 A1 | 4/2018 | Huang et al. | |
| 2019/0138708 A1* | 5/2019 | Agrawal | G06K 9/42 |
| 2019/0212827 A1* | 7/2019 | Kin | G02B 27/0179 |
| 2020/0250413 A1 | 8/2020 | Lu et al. | |
| 2020/0322142 A1 | 10/2020 | Huang et al. | |

OTHER PUBLICATIONS

L. O'Gorman, Comparing passwords, tokens, and biometrics for user authentication, Proceedings of the IEEE, vol. 91, No. 12, pp. 2021-2040, 2003.

L. v. d. Maaten and G. Hinton. Visualizing data using t-sne. Journal of Machine Learning Research, 9 (Nov):2579-2605, 2008.

Leap motion controller. URl: https://www.leapmotion.com.

M. Abadi, et al., Tensorflow: A system for large-scale machine learning, in Proceedings of the 12th USENIX Symposium on Operating Systems Design and Implementation (OSDI). Savannah, Georgia, USA, 2016.

M. Bashir and J. Kempf, Person authentication with rdtw based on handwritten pin and signature with a novel biometric smart pen device, In Computational Intelligence in Biometrics: Theory, Algorithms, and Applications, 2009. CIB 2009. IEEE Workshop on IEEE, 2009, pp. 63-68.

M. Frank, R. Biedert, E. Ma, I. Martinovic, and D. Song, Touchalytics: On the applicability of touchscreen input as a behavioral biometric for continuous authentication, IEEE transactions on information forensics and security, vol. 8, No. 1, pp. 136-148, 2013.

M. Piekarczyk and M. R. Ogiela, On using palm and finger movements as a gesture-based biometrics, in Intelligent Networking and Collaborative Systems (INCOS), 2015 International Conference. IEEE, 2015, pp. 211-216.

Microsoft HoloLens. https://www.microsoft.com/microsoft-hololens/en-us. Accessed: Feb. 1, 2017.

Microsoft Kinect, https://developer.microsoft.com/en-us/windows/kinect, accessed: Nov. 25, 2017.

N. Srivastava, et al., Dropout: a simple way to prevent neural networks from overfitting. Journal of Machine Learning Research, vol. 15, No. 1, pp. 1929-1958, 2014.

N. Z. Gong, M. Payer, R. Moazzezi, and M. Frank, Forgery-resistant touch-based authentication on mobile devices, in Proceedings of the 11th ACM on Asia Conference on Computer and Communications Security. ACM, 2016, pp. 499-510.

N. Zheng, A. Paloski, and H. Wang. An efficient user verification system via mouse movements. In Proceedings of the 18th ACM conference on Computer and communications security, pp. 139-150. ACM, 2011.

O. M. Parkhi, et al., Deep face recognition. In BMVC, vol. 1, No. 3, 2015, p. 6.

Project Soli—Google ATAP. https://atap.google.com/soli/. Accessed: Nov. 25, 2017.

R. Biddle, S. Chiasson, and P. C. Van Oorschot, Graphical passwords: Learning from the first twelve years, ACM Computing Surveys (CSUR), vol. 44, No. 4, p. 19, 2012.

R. Cappelli, et al., Performance evaluation of fingerprint verification systems, IEEE transactions on pattern analysis and machine intelligence, vol. 28, No. 1, pp. 3-18, 2006.

R. Mayrhofer and H. Gellersen. Shake well before use: Authentication based on accelerometer data. In International Conference on Pervasive Computing. Springer, 2007, pp. 144-161.

R. Renuka, et al., Online handwritten character recognition using digital pen for static authentication, in Computer Communication and Informatics (ICCCI), 2014 International Conference. IEEE, 2014, pp. 1-5.

R. Xia, Y. Pan, H. Lai, C. Liu, and S. Yan. Supervised hashing for image retrieval via image representation learning. In AAAI. vol. 1, pp. 2156-2162, 2014.

R. Zhang, L. Lin, R. Zhang, W. Zuo, and L. Zhang. Bit-scalable deep hashing with regularized similarity learning for image retrieval and person re-identification IEEE Transactions on Image Processing, 24(12):4766-4779, 2015.

D. Eastlake, S. Crocker and J. Schiller, Rfc 4086-randomness requirements for security, 2011.

S. Lee, K. Song, and J. Choi, Access to an automated security system using gesture-based passwords, in 2012 15th International Conference on Network-Based Information Systems. IEEE, 2012, pp. 760-765.

S. N. Patel, et al., A gesture-based authentication scheme for untrusted public terminals, in Proceedings of the 17th annual ACM symposium on User interface software and technology. ACM, 2004.

S. R. Klemmer, B. Hartmann, and L. Takayama. How bodies matter: five themes for interaction design. In Proceedings of the 6th conference on Designing Interactive systems, pp. 140-149. ACM, 2006.

Talon, the smart ring, https://www.titaniumfalcon.com/, accessed: Nov. 25, 2017.

W. Ma, et al. Password entropy and password quality, in Network and System Security (NSS), 2010 4th International Conference IEEE, 2010, pp. 583-587.

X. Glorot and Y. Bengio. Understanding the difficulty of training deep feed forward neural networks. In Proceedings of the thirteenth international conference on artificial intelligence and statistics, pp. 249-256, 2010.

Y. Cao, et al., Deep quantization network for efficient image retrival. In AAAI, pp. 3457-3463, 2016.

Y. Cao, M. Long, J. Wang, and S. Liu. Deep visual-semantic quantization for efficient image retrieval. In Proceedings of the IEEE Conference on Computer Vision and Pattern Recognition, pp. 1328-1337, 2017.

Y. Itaguchi, C. Yamada, and K. Fukuzawa. Writing in the air: Contributions of finger movement to cognitive processing. PloS one, 10(6):e0128419, 2015.

Y. Wen, et al., A discriminative feature learning approach for deep face recognition, in European Conference on Computer Vision. Springer, 2016, pp. 499-515.

Y. Yang, G. D. Clark, J. Lindqvist, and A. Oulasvirta, Free-form gesture authentication in the wild, in Proceedings of the 2016 CHI Conference on Human Factors in Computing Systems. ACM, 2016, pp. 3722-3735.

Y. Zhang and C. Harrison. Tomo: Wearable, low-cost electrical impedance tomography for hand gesture recognition. In Proceedings of the 28th Annual ACM Symposium on User Interface Software & Technology, pp. 167-173. ACM, 2015.

Y. Zhang, et al., The security of modern password expiration: An algorithmic framework and empirical analysis, in Proceedings of the 17th ACM conference on Computer and communications security. ACM, 2010, pp. 176-186.

(56) References Cited

OTHER PUBLICATIONS

J. Wu, J. Christianson, J. Konrad, and P. Ishwar. Leveraging shape and depth in user authentication from in-air hand gestures. In 2015 IEEE International Conference on Image Processing (ICIP 2015), pp. 3195-3199. IEEE, 2015.
A. Chahar, S. Yadav, I. Nigam, R. Singh, and M. Vatsa. A leap password based verification system. In Biometrics Theory, Applications and Systems (BTAS), 2015 IEEE 7th International Conference, pp. 1-6. IEEE, 2015.
A. Chan, T. Halevi, and N. Memon. Leap motion controller for authentication via hand geometry and gestures. In International Conference on Human Aspects of Information Security, Privacy, and Trust, pp. 13-22. Springer, 2015.
A. Krizhevsky, et al., Imagenet classification with deep convolutional neural networks, in Advances in neural information processing systems, 2012, pp. 1097-1105.
A. Ross, A. Jain, and S. Pankati. A prototype hand geometry-based verification system. In Proceedings of 2nd conference on audio and video based biometric person authentication, pp. 166-171, 1999.
A. Zaharis, A. Martini, P. Kikiras, and G. Stamoulis. User authentication method and implementation using a three-axis accelerometer. In International Conference on Mobile Lightweight Wireless Systems. Springer, pp. 192-202. 2010.
B. Ives, et al., The domino effect of password reuse, Communications of the ACM, vol. 47, No. 4, pp. 75-78, 2004.
B. Nassi, A. Levy, Y. Elovici, and E. Shmueli. Handwritten signature verification using hand-worn devices. arXiv preprint arXiv:1612.06305, 2016.
C. Amma, M. Georgi, and T. Schultz. Airwriting: a wearable handwriting recognition system. Personal and ubiquitous computing, 18(1):191-203, 2014.
C. Da, S. Xu, K. Ding, G. Meng, S. Xiang, and C. Pan. Amvh: Asymmetric multi-valued hashing. In The IEEE Conference on Computer Vision and Pattern Recognition (CVPR), Jul. 2017.
C. Qu, D. Zhang, and J. Tian. Online kinect handwritten digit recognition based on dynamic time warping and support vector machine. Journal of Information and Computational Science, 12(1):413-422, 2015.
Chaos computer club breaks apple touch id, http://www.ccc.de/en/updates/2013/ccc-breaks-apple-touchid, accessed: Oct. 8, 2016.
D. Florencio and C. Herley, A large-scale study of web password habits, in Proceedings of the 16th international conference on World Wide Web. ACM, 2007, pp. 657-666.
D. Gafurov and E. Snekkkenes, Arm swing as a weak biometric for unobtrusive user authentication, in Intelligent Information Hiding and Multimedia Signal Processing, 2008. IIHMSP '08 International Conference. IEEE, 2008, pp. 1080-1087.
D. Impedovo and G.Pirlo, Automatic signature verification: the state of the art, IEEE Transactions on Systems, Man, and Cybernetics, Part C (Applications and Reviews), vol. 38, No. 5, pp. 609-635, 2008.
D. J. Berndt and J. Clifford. Using dynamic time warping to find patterns in time series. In KDD workshop, vol. 10, pp. 359-370. Seattle, WA, 1994.
D. Lu and D. Huang, Fmhash: Deep hashing of in-air-handwriting for user identification, arXivpreprintarXiv:1806.03574, 2018.
D. Lu, D. Huang, Y. Deng, and A. Alshamrani. Multifactoruser authentication with in-air-handwriting and hand geometry. In 2018 International Conference on Biometrics (ICB). IEEE, 2018.
D. Lu, K. Xu, and D. Huang. A data driven in-air-handwriting biometric authentication system. In International Joint Conf. on Biometrics (IJCB 2017). IEEE, 2017.
D. Moazen, et al., Airdraw: Leveraging smartwatch motion sensors for mobile human computer interactions, in Consumer Communications & Networking Conference (CCNC), 13th IEEE Annual. IEEE, 2016.
D. P. Kingma and J. Ba. Adam: A method for stochastic optimization. arXiv preprint arXiv:1412.6980, 2014.

E. Farella, S. OModhrain, L. Benini, and B. Ricco. Gesture signature for ambient intelligence applications: a feasibility study. In International Conference on Pervasive Computing, pp. 288-304. Springer, 2006.
E. Hayashi, et al., Wave to me: user identification using body lengths and natural gestures, in Proceedings of the 32nd annual ACM conference on Human factors in computing systems. ACM, 2014, pp. 3453-3462.
E. M. Diaz, et al., Evaluation of ahrs algorithms for inertial personal localization in industrial environments in Industrial Technology (ICIT), 2015 IEEE International Conference. IEEE, 2015, pp. 3412-3417.
F. Chollet, Xception: Deep learning with depthwise separable convolutions, arXivpreprintarXiv:1610.02357, 2016.
F. Hong, et al., Waving authentication: your smartphone authenticate you on motion gesture, in Proceedings of the 33rd Annual ACM Conference Extended Abstracts on Human Factors in Computing Systems. ACM, 2015, pp. 263-266.
F. Okumura, A. Kubota, Y. Hatori, K. Matsuo, M. Hashimoto, and A. Koike. A study on biometric authentication based on arm sweep action with acceleration sensor. In 2006 International Symposium on Intelligent Signal Processing and Communications, pp. 219-222. IEEE, 2006.
F. Zhao, Y. Huang, L. Wang, and T. Tan. Deep semantic ranking based hashing for multi-label image retrieval. In Proceedings of the IEEE Conference on Computer Vision and Pattern Recognition, pp. 1556-1564, 2015.
G. Bailador, C. Sanchez-Avila, J. Guerra-Casanova, and A. de Santos Sierra. Analysis of pattern recognition techniques for in-air signature biometrics. Pattern Recognition, 44(10):2468-2478, 2011.
G. D. Clark and J. Lindqvist. Engineering gesture-based authentication systems. IEEE Pervasive Computing, 2015.
H. Lai, Y. Pan, Y. Liu, and S. Yan. Simultaneous feature learning and hash coding with deep neural networks. In Proceedings of the IEEE Conference on Computer Vision and Pattern Recognition, pp. 3270-3278, 2015.
H. Liu, et al, Deep supervised hashing for fast image retrival. In Proceedings of the IEEE conference on computer vision and pattern recognition, pp. 2064-2072, 2016.
H. Sajid and S. C. Sen-ching. Vsig: Hand-gestured signature recognition and authentication with wearable camera. In Information Forensics and Security (WIFS), 2015 IEEE International Workshop on, pp. 1-6. IEEE, 2015.
H. Wen, J. Ramos Rojas, and A. K. Dey. Serendipity: Finger gesture recognition using an off-the-shelf smartwatch. In Proceedings of the 2016 CHI Conference on Human Factors in Computing Systems, pp. 3847-3851. ACM, 2016.
H. Zhu, M. Long, J. Wang, and Y. Cao. Deep hashing network for efficient similarity retrieval. In AAAI, pp. 2415-2421, 2016.
Hi5VRGlove, https://hi5vrglove.com/,accessed: Nov. 25, 2017.
HTCVive, https://www.vive.com/us/, accessed: Nov. 25, 2017.
I. Aslan, A. Uhl, A. Meschtscherjakov, and M. Tscheligi. Mid-air authentication gestures: an exploration of authentication based on palm and finge motions. In Proceedings of the 16th International Conference on Multimodal Interaction, pp. 311-318. ACM, 2014.
J. Bonneau, et al., The quest to replace passwords: A framework for comparative evaluation of web authentication schemes, in 2012 IEEE Symposium on Security and Privacy. IEEE, 2012.
J. Daugman, New methods in iris recognition, IEEE Transactions on Systems, Man, and Cybernetics, Part B, vol. 37, No. 5, pp. 1167-1175, 2007.
J. Lester, B. Hannaford, and G. Borriello. are you with me?—using accelerometers to determine if two devices are carried by the same person. In International Conference on Pervasive Computing, pp. 33-50. Springer, 2004.
J. Liu, L. Zhong, J. Wickramasuriya, and V. Vasudevan. uwave: Accelerometer-based personalized gesture recognition and its applications. Pervasive and Mobile Computing, 5(6):657-675, 2009.
J. Tian, C. Qu, W. Xu, and S. Wang. Kinwrite: Handwriting-based authentication using kinect. In NDSS, 2013.
J. Tian, Y. Cao, W. Xu, and S. Wang. Challenge-response authentication using in-air handwriting style verification IEEE Transactions on Dependable and Secure Computing, 2017.

(56) References Cited

OTHER PUBLICATIONS

J. Wu, J. Konrad, and P. Ishwar. Dynamic time warping for gesture-based user identification and authentication with kinect in 2013 IEEE International Conference on Acoustics, Speech and Signal Processing. IEEE, 2013.
J. Wu. Gesture passwords: Concepts, methods, and challenges. PhD thesis, Carnegie Mellon University, 2016.
K. He, et al., Deep residual learning for image recognition, in Proceedings of the IEEE conference on computer vision and pattern recognition, 2016, pp. 770-778.
K. Lin, J. Lu, C.-S. Chen, and J. Zhou. Learning compact binary descriptors with unsupervised deep neural networks. In Proceedings of the IEEE Conference on Computer Vision and Pattern Recognition, pp. 1183-1192, 2016.
K. Simonyan and A. Zisserman. Very deep convolutional networks for large-scale image recognition. arXiv preprint arXiv:1409.1556, 2014.
L. Dipietro, A. M. Sabatini, and P. Dario. A survey of glove-based systems and their applications. IEEE Transactions onSystems, Man, and Cybernetics, Part C (Applications and Reviews), 38(4):461-482, 2008.

\* cited by examiner

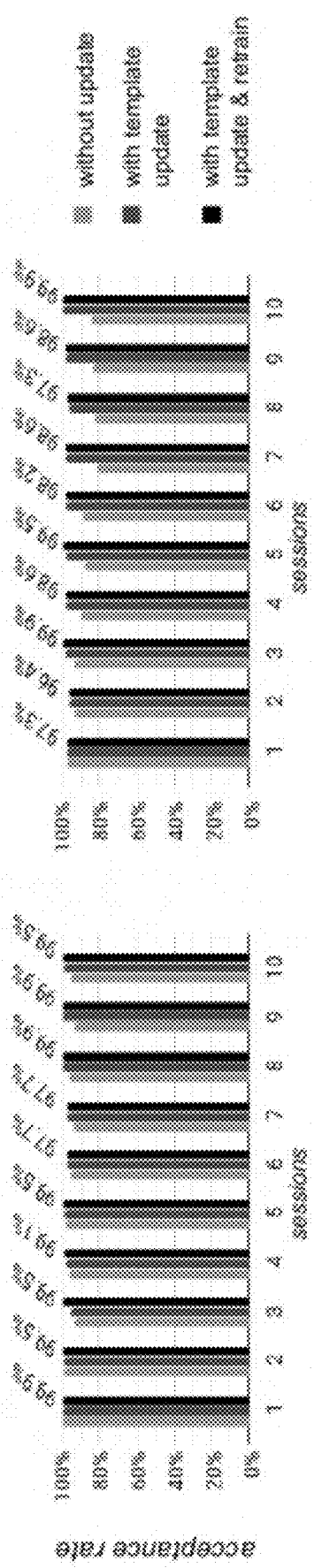
FIG. 10
FIG. 11

THREE-DIMENSIONAL IN-THE-AIR FINGER MOTION BASED USER LOGIN FRAMEWORK FOR GESTURE INTERFACE

CROSS-REFERENCE TO RELATED APPLICATIONS

This is a non-provisional application that claims benefit to U.S. provisional application Ser. No. 62/782,100 filed on Dec. 19, 2018, which is herein incorporated by reference in its entirety.

FIELD

The present disclosure generally relates to a user login framework; and in particular, to a three-dimensional in-the-air finger motion based user login framework for gesture interface.

BACKGROUND

Gesture interfaces are generally considered to be the next generation of Human-Computer Interface (HCI) which can fundamentally change the way humans interact with computers. A few standalone VR headsets present a virtual keyboard in the air and ask the user to type a password when logging in. However, this method is slow and user-unfriendly due to the lack of haptic feedback and limited recognition accuracy. Moreover, traditional passwords have their own drawbacks due to the ever-present trade-off between memory difficulty and password strength. Biometrics employ information strongly linked to the person, which cannot be revoked upon leakage and may raise privacy concerns for online login procedures.

Identity verification methods involving writing a password in the air have been studied for different input interfaces such as hand-held devices, cameras, and touchscreens. However, gesture input sensors have limited capability in capturing hand movements (e.g., limitation in accuracy, resolution, sampling speed, field of view, etc.). In addition, the user's writing behavior has inherent uncertainty in posture and magnitude. These facts make signal processing and feature extraction difficult. Second, the captured handwriting contains minor variations in speed and shape even for the same user writing the same content. Unlike a traditional password that does not tolerate a single bit difference, this ambiguity in the in-air-handwriting leads to difficulty in designing matching algorithms and limited discriminating capability. Hence, existing solutions rarely achieve an acceptable authentication performance. Third, user identification requires indexing a large amount of accounts using the ambiguous, inaccurate and noisy in-air-handwriting motion signals in order to efficiently locate the desired account upon a login request, which cannot be accomplished directly by current template-matching based methods. As a result, existing solutions must search the account database exhaustively to compare the signal in the login request with the template, which is impractical for real world usage. Fourth, for data-driven methods that train a model to recognize each account and classify the handwriting, available signal samples at registration are scarce because of usability considerations. Since the user can only realistically be asked to write the passcode a few times to sign up, the effectiveness of model training is significantly restricted.

It is with these observations in mind, among others, that various aspects of the present disclosure were conceived and developed.

BRIEF DESCRIPTION OF THE DRAWINGS

FIG. 10 shows graphical representations of the authentication permanence performance with the glove device and the camera device;

FIG. 11 shows graphical representations of the identification permanence performance with the glove device and the camera device;

Corresponding reference characters indicate corresponding elements among the view of the drawings. The headings used in the figures do not limit the scope of the claims.

DETAILED DESCRIPTION

Applications using gesture-based human-computer interface require a gesture-based login method due to the fact that gesture-based interfaced tend to lack input methods to type passwords. However, due to various challenges, existing gesture based authentication systems are generally considered too weak to be practical. Thus, a unified user login framework using 3D in-air-handwriting is disclosed herein. New types of features are identified to distinguish legitimate users from attackers and utilize Support Vector Machine (SVM) for user authentication. The features and data-driven models are specially designed to accommodate minor behavior variations that existing gesture authentication methods neglect. In addition, the framework uses deep neural network approaches to efficiently identify the user based on his or her in-air-handwriting, which avoids expansive account database search methods employed by existing work.

Figure 1:
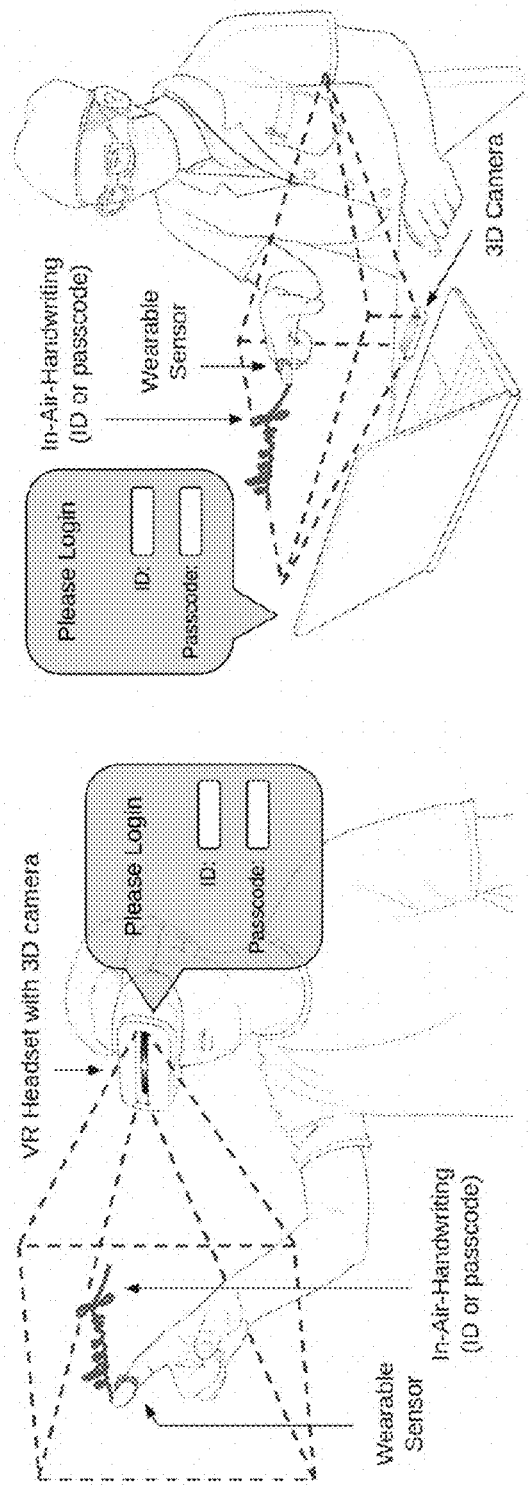
FIG. 1 shows several illustrations of a user logging into a device through a gesture interface with hand motion capturing devices.
Figure 4:
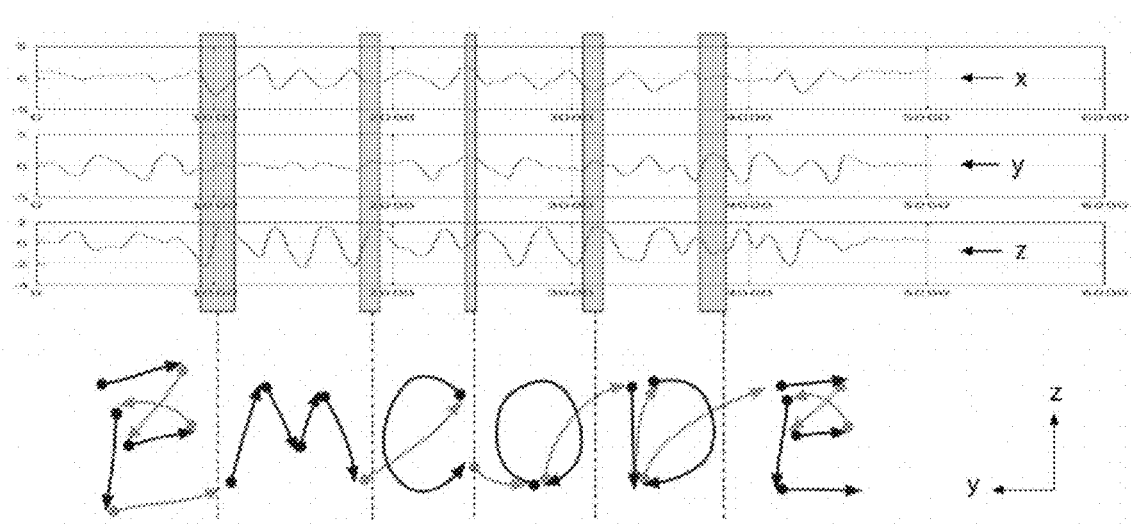
FIG. 4 is an illustration of an example 3-dimensional finger motion signal when writing a gesture passcode and the correspondence of signal segments to letters.

To address these problems, a unified user login framework is disclosed herein. A user interacts with the login framework by writing an ID and a passcode in the air with the index finger, as shown in FIG. 1. The finger motion is captured by either a wearable inertial sensor or a 3D depth camera and communicated to the server as a login request. The user can write very quickly, write in a language unable to be directly typed with a standard keyboard, or just doodle, as long as the finger motion can be easily reproduced in a stable manner. Based on collected data, the chosen content of the ID or the passcode is usually a meaningful string or a shape that is easy to remember, while the writing appears to be just scribbles illegible for anyone except the creator. This enables a much larger space for the ID and the passcode than a traditional password consisting of only typed characters. Additionally, as a result of differences in writing conventions from person to person, memorable gesture-based passcodes are not as susceptible to attack as traditional passwords. For example, the user can write a string "FMCODE" as an ID or a passcode as shown in FIG. 4. In another example, the user can draw a five-point star as an ID or a passcode which cannot be typed over the keyboard. Meanwhile, it has been proven that graphical/visual memory is easier to remember and stays in the mind longer than passwords typed over the keyboard. Due to this unique feature, the in-air-handwriting is referred to herein as a "gesture passcode" rather than a "password".

Unlike most handwriting recognition technologies, the present framework does not attempt to understand each character on an individual basis; rather, the present framework identifies and authenticates users based on multiple factors including a difference of passcode content and fineness of handwriting convention. Hence, the present system possesses revocability advantages of traditional passwords as well as non-repudiation advantages of biometrics.

System Model—User Login Framework

Similar to traditional password-based login systems, the present system requires an initial registration comparable to the familiar password registration step. At the registration step, the user is required to create an account with a unique ID and a gesture passcode, and to write the ID as well as the gesture passcode in the air a few times. The user can then sign into the created account by writing the same ID and gesture passcode in the air.

Figure 2:
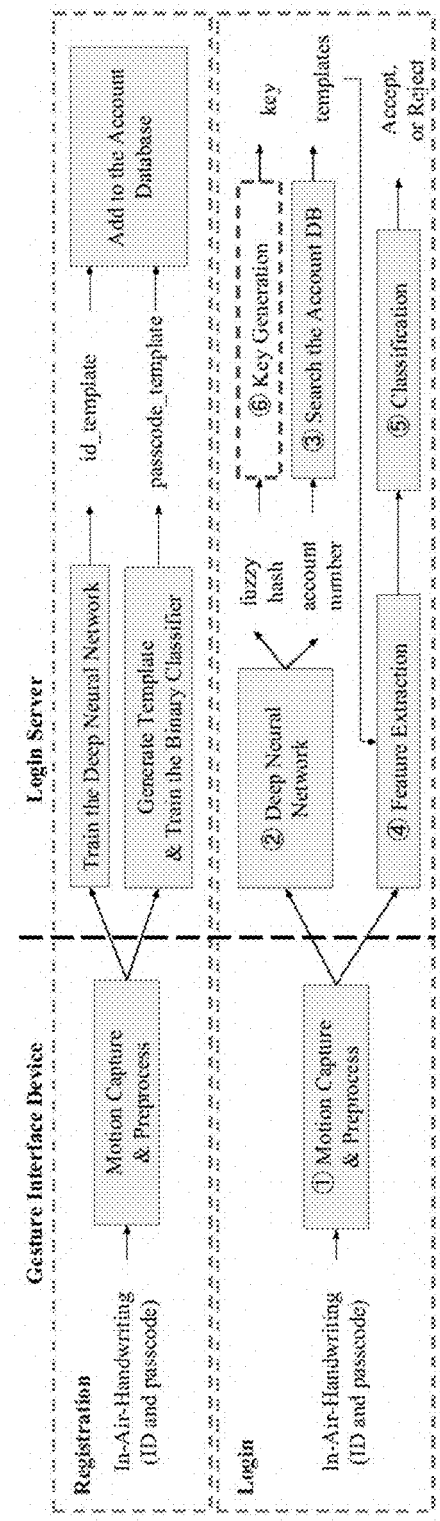
FIG. 2 is an illustration showing the system architecture and procedures for the present framework.

As shown in FIG. 2, there are two functional modules within the framework: (a) a gesture user interface (UI) device equipped with motion capture sensors, and (b) a login server that stores the account database. On the user side, finger motion of a piece of in-air-handwriting for both the ID and the gesture passcode is obtained, and two corresponding signals including the physical states of the hand are generated. Then, the gesture UI device preprocesses the signals and sends them to the login server. On the server side, each account in the database contains a tuple including (account number, id_template, passcode_template). The account number is a number or a string of characters usually allocated by the server to uniquely index each account. The ID template and the gesture passcode template are generated by the in-air-handwriting signals of the ID and the gesture passcode captured at registration in order to match with signals in the login request. Once the registration is complete, the login server has two main functions including user authentication and user identification that can be used independently or together.

User Authentication:

Given the account number, the system must verify the user identity and "accept" or "reject" the login request using a piece of in-air-handwriting of the passcode in the request. The account number may be typed, remembered, recognized by face or other means, or obtained using the identification function detailed below. In this function, the server executes the following three steps: (a) retrieve the passcode_template of the user's account according to the account number from the account database (step 3 in FIG. 2), (b) compare the template with the signal in the login request to extract features (step 4 in FIG. 2), (c) determine whether this login request is accepted or rejected using a binary classifier trained at registration (step 5 in FIG. 2).

User Identification:

The system must figure out the account number based on a piece of in-air-handwriting of the ID. As mentioned in the previous function, an account number is required, which is usually a number or a character string too inconvenient to enter through the gesture user interface. Thus, the user can be asked to write their ID in the air. In this function, the server first obtains one or more candidate account numbers using a deep CNN (convolutional neural network) (step 2 in FIG. 2). The server then runs the same three steps as the authentication to verify each candidate account by comparing the id_template and the captured login signal of the in-air-handwriting of the ID. Finally, the best matched account number is returned. If all candidate IDs fail the verification, "unidentified" is returned and the user may be prompted to try again.

It should be noted that identifying the account number does not necessarily mean authenticating the user at the same time because an ID is usually not secret, unlike a passcode. The objective of user authentication is low error rate and high security, while the objective of user identification is fast search speed with acceptable accuracy. The disclosed login procedure is essentially performing both identification and authentication. Moreover, the user can explicitly update or revoke their gesture passcode just like updating or resetting a traditional password at any time. In addition, the server can generate fuzzy hash from the in-air-handwriting of the passcode using a similar deep CNN. This fuzzy hash can be used to further generate cryptographical keys to enable more sophisticated authentication protocols or encrypt the template used in the login procedure in order to minimize the risk of server storage leakage.

System Requirements for Application Scenarios

The present framework is compatible with existing IT infrastructures using traditional password-based authentication. On the server side, software changes would be required, including the construction of templates, the implementation of feature extraction algorithms, the classifier and the deep CNN. A requirement of the network between the client and the server is the same as most password-based authentication systems through the web. On the client side, a motion capture device such as a wearable device or a 3D depth camera is required. However, it should be noted that the login framework leverages the built-in gesture interface of the client machine rather than requiring a dedicated device for the login purpose. As long as the finger motion can be captured for ordinary gesture-based interaction with the computer, the present framework can be deployed. For example, in existing Virtual Reality (VR) applications, the VR headsets usually provide native sensors for finger motion capturing. In addition, login through the present framework requires the active involvement of a conscious and willing user, rather than presenting a piece of static information such as password or fingerprint that can be reproduced without the user's permission. For example, a system using fingerprints can be sabotaged by an attacker secretly using the hand of a legitimate user when he or she is asleep or using fingerprints obtained from objects that the legitimate user touches, while this kind of attack is not possible in the presented framework.

Target application scenarios include VR headsets and wearable computers that already have a gesture interface but lack keyboards or a touchscreen, as well as scenarios that provide gesture interface but inconvenient for typing such as an operating theater or a clean room where touch is not a preferred option. The present framework can be used for two different purposes. The first one is online user authentication or identification, where the server is remotely connected to the client via the Internet. For example, the user can sign into an online personal account through the gesture interface on a VR headset. The second one is local user authentication or identification, where the client and server reside on the same machine. For example, the user can unlock their wearable devices through the gesture interface. In addition, the present framework can also be used as a supplementary authentication factor in a Multi-Factor Authentication (MFA) system together with traditional password or biometrics.

Attack Mode

The present framework has the same security assumptions as existing gesture-based authentication and identification systems as follows: (1) the device on the user side is secure (i.e., no sniffing backdoor); (2) the authentication server is secure (i.e., it will not leak the stored template to malicious attackers); and (3) the communication channel between the user and the server is secure (i.e., no man-in-the-middle attack). These security assumptions are also similar to traditional biometric-based and password-based systems. Attacks with relaxed security assumptions on (2) and (3) are further discussed below. Based on the assumptions, this disclosure is mainly focused on attacks on the user side including random guessing and spoofing.

Random guessing refers to when the attacker tries to enter a user's account by guessing a passcode and signs it on the same gesture interface, without any knowledge of the content of the passcode. Spoofing refers to when the attacker knows the content and broad strokes of the passcode of an account and tries to write it in the air through the same gesture interface. This is similar to a case in which an attacker signs into the victim's account with the password leaked.

For the spoofing attack, it is assumed that the attack source is a human attacker, and the attacker's goal is to sign into the victim's account or be identified as the victim. If the attack is successful, the account owner may suffer from loss of the account or leakage of private information. Though it is generally considered that the ID is not a secret, in extreme cases, if the attacker is wrongly identified as the victim, they may launch further attacks e.g., phishing other sensitive personal information of the victim.

In-Air-Handwriting Characterization—Finger Motion Signal Model

Figure 3:
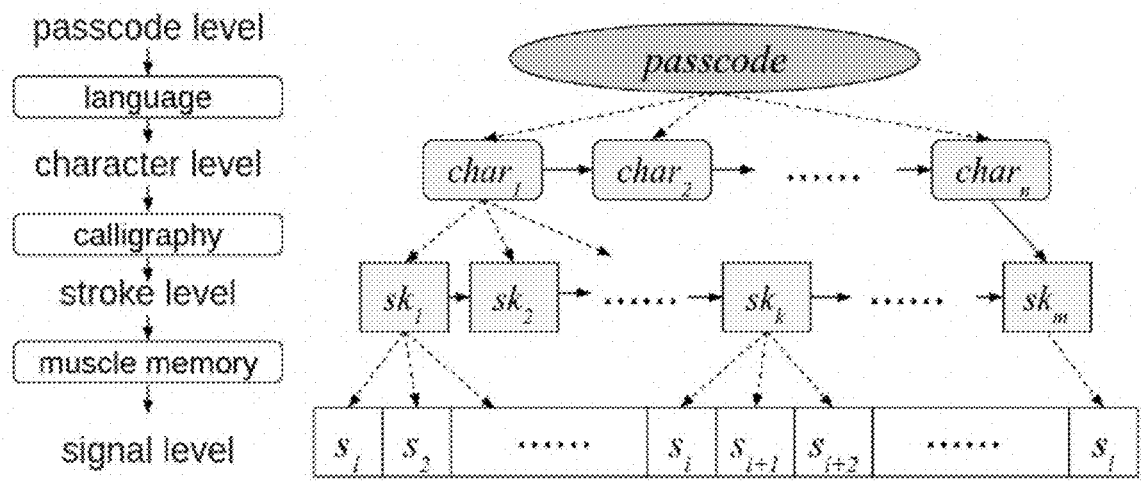
FIG. 3 shows illustrations of in-air-handwriting signal model.

Handwriting is closely related to the cognitive process of humans in different levels, and hence, the in-air-handwriting is modeled as a stochastic process at four levels: passcode level, character level, stroke level, and signal level, as shown in FIG. 3. Usually, each passcode is a string of meaningful symbols or characters in some language. The passcode is made of strokes defined by calligraphy, and the strokes further determine the hand motion of the writing through the muscle memory. The hand motion is captured as a series of samples of physical states of the hand and fingers. The passcode, characters, and strokes can be regarded as hidden states in a stochastic process, and only the signal samples are the observations. In general the in-air-handwriting process does not satisfy the Markov property (i.e., signal samples are correlated), and the mapping between signal samples and strokes are not fixed due to the minor variations of the writing speed and amplitude. However, the inherent process in the brain of generating hand motion by writing is acquired and reinforced when a person learns how to write, which indicates that the writing behavior is bound to individuals and persistent in the long term, as handwriting signature has been widely used for identity verification for a long time.

A vector series $s=(s_1, s_2, \ldots, s_I)$ is used to denote the finger motion signal with I samples, where $s_{i1}=(s_{i1}, s_{i2}, \ldots, s_{id})$ represents an individual sample obtained by the sensor with d axes. For example, if the signal is obtained from a wearable device with an inertial sensor, each sample $s_i$ may have three axes representing the acceleration of the fingertip of the right hand along the x, y and z-axes, and the whole signal s may have 250 samples at 50 Hz. Assume the signal s is aligned in a fashion that the writing speed variation is removed, it can be decomposed as $$s_i = t_i + e_i, \ e_i \sim N(0, \Sigma_i),$$

where $t_i$ is a constant vector determined by the content of the in-air-handwriting, and $e_i$ is a vector of Gaussian random variables caused by the sensor noise and unintentional small hand movements. Since $e_i$ is from different orthogonal sensor axes, we assume these axes are independent, i.e., $\Sigma_i = \sigma_i I$, where $\sigma_{i1}, \sigma_{i2}, \ldots, \sigma_{id}$. An approximation of $t_i$ and $\sigma_i$ can be obtained by the signals $\{s^1, s^2, \ldots, s^T\}$ at registration, $$\hat{t}_i = \frac{1}{K}\sum_{k=1}^{K} s_i^k, \ \hat{\sigma}_i = \frac{1}{K-1}\sum_{k=1}^{K}(s_i^k - \hat{t}_i)$$

Figure 5:
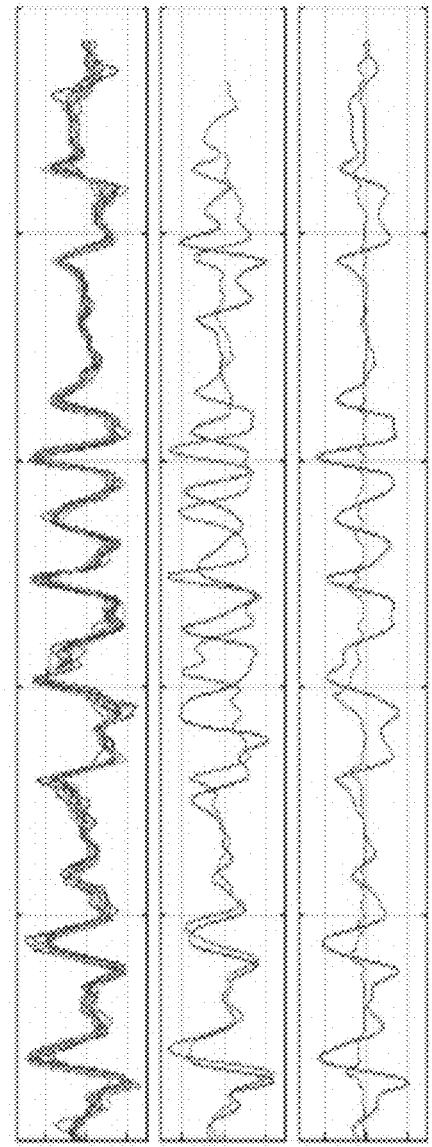
FIG. 5 show graphical representations of an example of 10 aligned finger motion signals.

Here $\hat{t}_i$ is the Maximum Likelihood Estimation (MLE) of $t_i$ and $\hat{\sigma}_i$ is the unbiased MLE of $\sigma_i$. For each account, t is stored as the id_template or the passcode_template, depending on whether $s^k$ is obtained by writing the ID or the passcode. $\hat{\sigma}$ is also stored together with the template to indicate the template uncertainty. The aligned signal set $\{s^k\}$ can be obtained by aligning each raw signal at registration to the first signal. An example is shown in FIG. 5. In present framework, alignment is made by the Dynamic Time Warping (DTW) algorithm.

In-Air-Handwriting Signal Preprocessing

As mentioned previously, there is also user behavior uncertainty in the writing posture and magnitude. To minimize the influence of such uncertainty, the following preprocessing steps are applied on the client side.

Step 1) State Estimation:

Derive the indirect dynamic states from the raw sensor output and fix any missing signal samples due to the limited capability of the motion capture device. For the wearable device with inertial sensors, the absolute orientation of the index finger relative to the starting position is derived. For the 3D camera device, the velocity and acceleration are derived for each sample from the position difference. The position trajectory and posture are estimated from the depth image frames by the 3D camera device itself.

Step 2) Trimming:

Throw away the sample at the start and the end of the signal where the hand does not move intensively. In practice, the signal can be trimmed in a more progressive way because we observed that the user behavior has larger uncertainty at the beginning and the end.

Step 3) Low-Pass Filtering and Resampling:

Remove the high-frequency components above 10 Hz because it is commonly believed that a person cannot generate finger movements faster than 10 Hz. Then the signal is resampled at 50 Hz to remove influence on the variation of sampling rate.

Step 4) Posture Normalization:

Translate the coordinate system to assign the average pointing direction of the hand as the x-axis in order to remove the influence of posture variation respect to the motion capture device. For the glove device with inertial sensors, the influence of the gravity on the acceleration axes is also removed.

Step 5) Amplitude Normalization:

Normalize the data of each sensor axis individually, i.e., $s_{ij} \leftarrow (s_{ij} - \mu_j)/\sigma_j$ where $\mu_j = \text{mean}(s_{ij}, \ldots, s_{ij})$, $\sigma_j = \text{std}(s_{1j}, \ldots, s_{ij})$.

User Authentication

The task of authentication is essentially a binary classification problem. The design goal is to build a data-driven model that can optimally distinguish the signals from legitimate users and attackers. Given an account A and an authentication request with signal s obtained from the in-air-handwriting of the passcode (referred as the passcode signal), the following classes are defined:

1) If s is generated by the owner of account A writing the correct passcode, s is from the "true-user" class;

2) if s is generated by any user writing an incorrect passcode, s is from the "guessing" class (which means the writer does not know the passcode content);

3) if s is generated by an imposter writing the correct passcode of account A, it is defined that s is from the "spoofing" class (which means the attacker knows the passcode content).

The "guessing" and "spoofing" classes are collectively called the "not-true-user" class. Our authentication method is based on the signal model explained previously—signals generated by the same user writing the same passcode have similar shape if they are aligned because they contain the same sequence of strokes. Hence, a temporal local distance feature that measures the difference of the signals locally in stroke level is defined. Moreover, a method is also designed to generate multiple feature vectors from just one pair of signal and template to overcome the shortage of training data at registration. Furthermore, an ensemble of SVM classifiers are used for each account to distinguish signals from the "true-user" class and "not-true-user" class to maintain a stable long term performance.

Feature Extraction

Given an account A, consider s is the passcode signal in an authentication request, and t is the passcode_template of account A constructed at registration with uncertainty Q. The temporal local distance features are extracted as follows.

Step 1:

Align s to $\hat{t}$ using DTW, so that the aligned s will have the same length l as $\hat{t}$.

Step 2:

Calculate the distance $d_j = \text{abs}(s_j - \hat{t}_j)$, where abs( ) is the element-wise absolute function.

Step 3:

Segment d into H local windows, and each window has length W=l/H, i.e., regroup d as $(D_1, D_2, \ldots, D_H)$, where $D_j = (d_{j_xW+1}, d_{j_xW+2}, \ldots, d_{j_xW+w})$.

Step 4:

Randomly pick T different local windows as a window set $\{j_1, j_2, j_T\}$, then randomly select a local distance feature from each window to form a feature vector $x = (xj_1, xj_2, \ldots, x_{jT})$, where each element $x_j$ is chosen from $D_j$. Here x is defined as the temporal local distance feature. For example, assume d has 10 samples, segmented to five windows, and we can randomly pick two windows (i.e., l=10, H=5, W=2, T=2). Consider picking the third window ($d_5$ to $d_6$) and the fifth window ($d_9$ to $d_{10}$), then a feature vector can be formed by randomly choosing one sample from each window, such as ($d_6$, $d_9$).

Step 5:

Given a certain window set, step 4 can be repeated multiple times to generate multiple feature vectors from one pair of signals and templates. Especially, $d_i$ can be regarded as a Gaussian random variable and draw samples from the distribution $d_i \sim N(\text{abs}(s_i - \text{lt}_i), \hat{\sigma}_i$ in step 4. This technique allows augmentation of the training data from the limited signals with "true-user" label at registration.

Binary Classification for Authentication

The SVM classifier is a binary classifier with a linear decision boundary in the feature space that can be trained efficiently even with limited data and high feature dimension. These characteristics are suitable for the authentication task. Given a training dataset with data points $\{(x^1, y^1), (x^2, y^2), \ldots, (x^n, y^n)\}$, where $\{x^i\}$ are the feature vectors and $\{y^i\}$ are binary class labels from $\{-1, +1\}$, SVM seeks a hyperplane $f(x) = wx + b = 0$ to maximize the separation of the data points of the two classes. Training SVM is equivalent to solving a quadratic programming problem, which can be done efficiently. However, since the decision boundary is very simple, naively applying SVM on d obtained from limited signals at registration would still suffer from the "curse of dimensionality" problem associated with high data sparsity and lead to poor long term stability. Hence, an ensemble of SVM are trained.

Consider the present framework registering the account A and the template t is constructed from signals $\{s^1, s^2, \ldots, s^K\}$. At registration, the server builds M SVM classifiers for account A, with a distinct set of T windows $\{j_1, j_2, \ldots, j_T\}$ randomly picked for each classifier. To train a single classifier, the server first extracts feature vectors from those K registration signals of account A, and assigns them the label y=+1 (i.e., "true-user" class). The server then extracts feature vectors from those registration signals of other accounts except the account A, and assigns them the label y=−1 (i.e., "guessing" class). Usually there are more training data of the "guessing" class than necessary. Thus, only a portion is needed (usually round one thousand). After the feature vectors and labels of both classes are ready, an SVM is trained using Sequential Minimal Optimization (SMO). Finally, once all M classifiers are trained, the server stores the model parameters w, b, and the set of windows $\{j_1, j_2, \ldots, j_T\}$ of each classifier in the account database together with the template t.

When signing into account A, given a signal s in the authentication request, the server extracts feature vectors for each SVM classifier using the stored information, and predicts a score $f(x) = wx + b$. Since multiple feature vectors can be extracted with one set of windows, the server can obtain multiple scores from a single s and average them. Once the scores of all classifiers are ready, they are further averaged to produce a single distance score, i.e., $\text{score}(s) = \text{average}(\{f(x)\})$. Finally, this score is compared with a pre-set decision threshold. If score(s)<threshold, the authentication request with signal s is accepted, otherwise, it is rejected.

The aim of the feature extraction method and classifier ensemble is to achieve a better separation of signals from different classes in the feature space and maintain a stable performance in the long term. If a signal is from the "true-user" class, it should have a small score because similar shape between the signal and the template leads to smaller d. Signals from the "not-true-user" classes should have a larger score caused by large values of elements of d due to shape differences whose origin is the different content or different writing convention expressed in the signal. However, the distance in sample level has uncertainties because of the minor variations in writing behavior for the same user writing the same content. Misclassification caused by such uncertainties may happen quite often if the sample level distance is blindly summed, as the plain DTW (data time warping) algorithm. Instead, local samples are grouped into segments which roughly map to the strokes, and hence, the present method can tolerate the signal level uncertainties by comparing subsets of strokes instead of individual samples. The final score of the ensemble of classifiers is essentially a weighted sum of the sample-wise distance d, where the trained weights help select those segments with less uncertainty and more consistency. In the present framework, H, T and M are system-wide parameters. H is usually chosen from 20 to 80 to approximate the number of strokes of an in-air-handwriting passcode. T is usually empirically chosen based on passcode length to avoid the "curse of dimensionality". M is determined as a tradeoff between the computation time and authentication accuracy. In an extreme case, T and M can be chosen as T=H and M=1, which means only a single SVM is used to draw a decision boundary in a very high dimensional feature space (this dimension can potentially reach several hundred or even exceed one thousand). This may cause classifier stability issues in the long term because some local features may be wrongly considered to be consistent due to the limited amount of training data.

User Identification

Unlike the authentication task, the task of identification is essentially a multi-class classification problem, which must be done efficiently without querying the account database in a linear manner.

A deep CNN is a type of neural network comprising cascaded convolutional layers and pooling layers. The most attractive capability of a deep CNN is that it can learn and detect features from low-level to high-level automatically by iteratively optimizing a loss function. This characteristic is crucial to solve very complicated pattern recognition problems, most notably the image classification. As illustrated previously in the signal model, a piece of in-air-handwriting contains hierarchical features at different abstract levels, and hence, a deep CNN is suitable to the system objective of mapping a signal s of the in-air-handwriting of the ID (referred as the ID signal) to its corresponding account number. However, deep CNN has not been used in in-air-handwriting signal based user identification since the features expected to be learned in a 3D handwriting signal are fundamentally different from features expressed in a 2D image, which requires the following special treatment.

Figure 6:
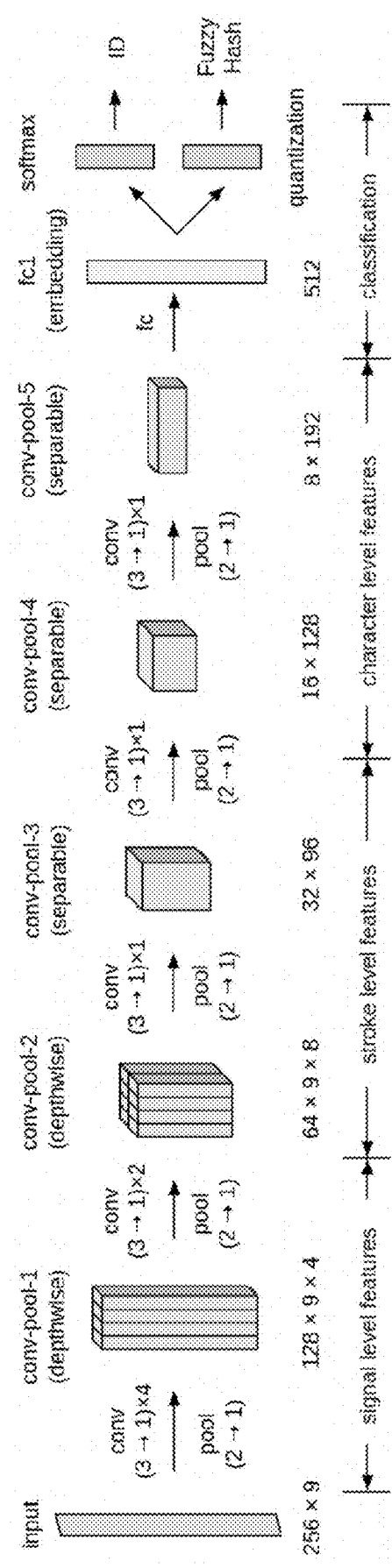
FIG. 6 is an illustration showing a convolutional neural network for user identification.

The deep CNN in the present framework includes five convolutional-pooling layers, one fully-connected layer, and one softmax layer, as shown in FIG. 6. The raw signal is first preprocessed and stretched to a fixed length of 256 elements through linear interpolation, in order to be fed into the CNN. For example, if the number of sensor axes is 9, the input is a 256 by 9 matrix, where each sensor axis is regarded as an individual channel. For each convolutional-pooling layer, a convolutional kernel of size 3 is applied to all the channels of the previous layer, and a 2-by-1 maxpooling on the output of the convolutional layer for each channel. The first two convolutional layers utilize depth-wise convolution which detects local features individually on each channel since these channels contain different physical states in orthogonal axes. The latter three convolutional layers utilize separable convolution which associates low level features on all channels to construct high level features. For example, each neuron in the third cony-pool layer has a receptive field of 16 samples in the original signal, which is roughly corresponds to one stroke. There are 96 filters in this layer which can map to 96 different types of features in the stroke level. These features can capture different types of basic finger movement when writing a single stroke, including straight motion in different directions, and sharp turning between adjacent strokes. Hence, the output of this layer is a 32 by 96 matrix indicating the presence and intensity of a certain type of stroke (among all 96 types) at a certain place of the signal (among 32 slightly overlapping segments). Similarly, the fourth and fifth cony-pool layers are designed to detect the presence of certain characters and phrases. Finally, a fully connected layer runs classification on the flattened high level features and generates the embedding vectors, and the softmax layer maps the embedding vectors to probability distribution of class labels (i.e., the account numbers).

A major challenge of training the CNN is the limited amount of data at registration, which leads to over-fitting easily. To overcome this hurdle, the training dataset is augmented with the following three steps. First, given K signals $\{s^1, s^2, \ldots, s^K\}$ obtained at registration, for each $s^k$ in this set, the server aligns all the other signals to $s^k$ to create K−1 new signals. The server then randomly picks two aligned signals and exchanges a random segment. This can be done many times to further create many new signals. Third, for each newly created signal, the framework randomly perturbs a segment both in time and amplitude. After data augmentation, dropout is applied on the fully-connected layer to prevent over-fitting during training.

To predict the account number of an input signal, the server simply chooses the most probable class or top-k most probable classes in the output probability distribution. However, blindly believing the predicted account number of the CNN may render the server extremely vulnerable to spoofing attacks because the decision is based on the presence of certain strokes detected by the feature layers, and a spoofed signal generating by writing the same content as the genuine signal naturally has the majority of the strokes. As a result, in the present framework the server performs an additional step to verify the identity, using the same procedure as the authentication. Instead of a passcode signal, here the server compares the ID signal and the id_template of the account corresponding to each candidate account number. Finally, the server returns the best matched account number or "unidentified" if the scores of all account are above the threshold.

Experimental Evaluation—Data Acquisition

To evaluate the present framework, a prototype system was built with two types of gesture-input devices. The first device is a custom made data glove with an inertial measurement unit (IMU) on the tip of the index finger (referred to herein as the "glove device"). Such an IMU has been widely used in the handheld remote controller of current VR game console and smart TV, and it is relatively inexpensive (<$10). The glove also has a battery-powered microcontroller on the wrist, which collects the IMU data at 50 Hz, and runs the state estimation preprocessing step. The output signal of this device contains a series of three Euler angles in ±180°, tri-axis acceleration in ±4 g, and tri-axis angular speed in ±2000 dps. The second device is the Leap Motion controller (referred to herein as the "camera device"), which is an inexpensive (~$80) commercial-off-the-shelf 3D camera. It contains a stereo infrared camera that can capture depth image at 55 Hz~110 Hz with an average 135° Field of View (FOV) and a range of 60 cm. The Leap Motion controller has its own processor that can estimate the hand skeleton of each frame and obtain the 3D coordinate of each joint of the hand. The client machine runs the state estimation and other preprocessing steps, and outputs signal of a series of 3D position, velocity, and acceleration.

Although the present framework uses these two specific devices for proof of concept and evaluation, the present framework does not necessarily depend on these two devices. The present system should work with any similar device that can return samples of physical states of the fingers and the hand with a reasonable range, resolution and sampling rate. For example, there are other gloves and rings with inertial based motion tracking, and there are open source software available that can estimate a hand skeleton from 2D image or 3D depth image. It is assumed that these devices are part of the gesture user interface for ordinary human-computer interaction, not specialized devices dedicated for the login purpose.

Figure 7:
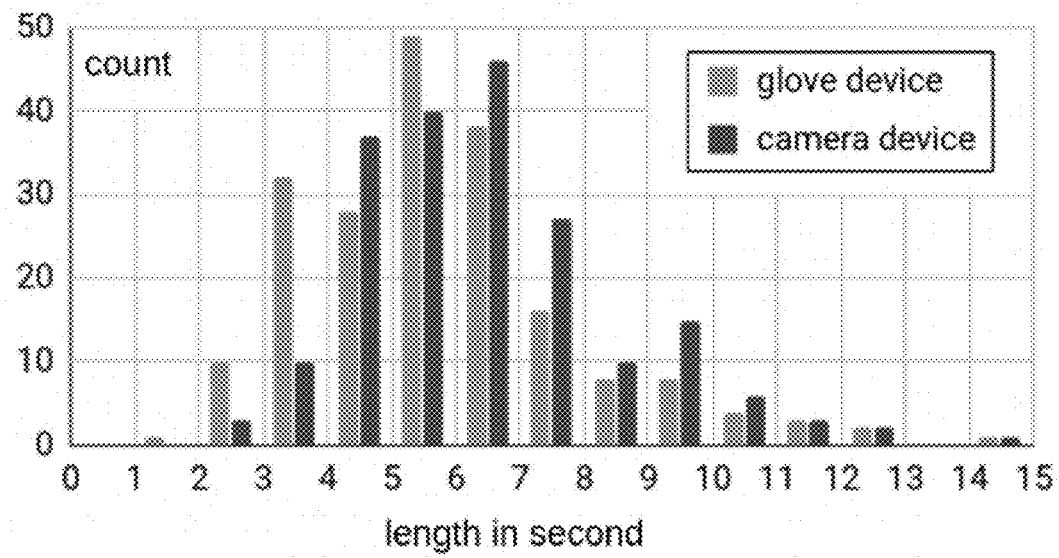
FIG. 7 is a graphical representation showing a distribution of passcode lengths of the signals in dataset 1.

Datasets were built as follows:

1) 105 and 109 users were invited to participate in the data collection with the glove device and the camera device respectively. 56 users used both devices. Each user created two distinct strings. The user wrote each of their strings in the air 5 times for registration, and after a rest, they wrote their strings 5 times again as login. The distribution of the lengths of all the strings is shown in FIG. 7 (users write a little slower with the camera device as opposed to the glove device due to its limited field of view and range).

2) For each of the string in the first dataset, 7 impostors spoofed it for 5 times (due to the size of the first dataset there are more than 7 impostors in total). Here, "spoof" means that the impostors know the content of the string, and try to write it using the same motion capture device as that used by the spoofing target user.

3) 25 users participating in the first dataset were asked to write the two created strings in multiple sessions. For each of the string, besides the 5 times at registration, the user wrote it 5 times as one session, two or three sessions a week on different days, for a period of 4 weeks (10 sessions in total).

4) Among the users who participate in the data collection of both devices in the first dataset, 28 of them filed a questionnaire on the usability of the prototype system (detailed in section VII)

At the beginning of the data collection, the users were briefly introduced to the system and informed that the in-air-handwriting is for login purposes. The users are allowed to practice writing in the air a few times. During the data collection, the user can voluntarily abort the writing and the incomplete data is discarded. Only one glove device or one Leap Motion controller are used at a time and the data collection processes with the two devices are separate. All users write with the right hand and wear the glove on that hand. The Leap Motion controller is placed on a table. Both devices are connected to a laptop as the client machine. For the first dataset, there is no constraint on the content of the string created by the user except distinctiveness. Also there is no constraint on the writing convention. For example, the user can write in various directions, stack every character on the same place, write while standing or sitting, with elbow supported or not supported. Most users write very fast and their writing is illegible, much like a traditional signature. Since the strings in the first dataset are distinct, they are used either as a passcode for authentication or an ID for identification.

Authentication Experiments and Results

For authentication, each individual string is considered to be the passcode of an account, and in total there are 210 and 218 accounts with the glove and camera device respectively. The following procedures were run with the 64 window (H=64), 16 local features for each individual classifier (T=16), and 32 classifiers as an ensemble (M=32).

1) The registration process was followed to create all the accounts, construct passcode_template and train the classifier for each account. For the five signals for registration, all of them are used to construct the template and train the SVM classifier. Thus, for each account there are five training signals with "true-user" label, and 5×(210−1) or 5×(218−1) training signals with "not-true-user" label (i.e., the training signals of other accounts).

2) The framework uses each s of the five testing signals of the same account as an authentication request (i.e., the ground truth label of s is "true-user"). If a signal from the "true-user" class is misclassified to "not-true-user" class, the result is a False Reject (FR); otherwise the result is a True Accept (TA).

3) The framework uses each s of the five testing signals of an account as an authentication request to all other accounts (i.e., the ground truth label of s is "guessing"). If a signal from the "guessing" class is misclassified to the "true-user" class, the result is defined as a False Accept (FA), otherwise the result is a True Reject (TR).

4) The framework uses each s of the five spoofing signals in the dataset 2 as an authentication request to the spoofing target account (i.e., the ground truth label of s is "spoofing"). If a signal from the "spoofing" class is misclassified to the "true-user" class, the result is defined as a Successful Spoof (SS), which is considered as a special case of FA.

Figure 8:
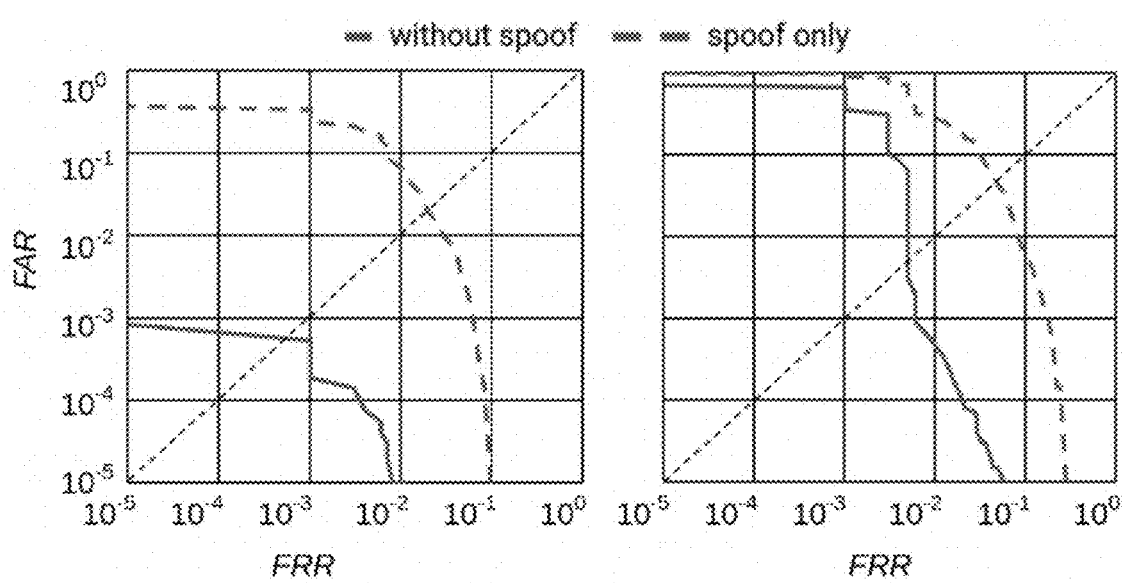
FIG. 8 shows graphical representations of ROC (a false accept rate vs. a false reject rate) with a glove device and the camera device.

The main evaluation metrics are False Reject Rate (FRR) and False Accept Rate (FAR), which are the portions of false rejects and false accepts in all authentication requests respectively, formally defined as follows:

$$FRR = \frac{1}{kn}\sum_{i=1}^{n} \#\{FR_i\},$$

$$FAR = \frac{1}{kn(n-1)}\sum_{i=1}^{n}\sum_{j=1, j\neq i}^{n} \#\{FA_{ij}\},$$

$$FAR_{spoof} = \frac{1}{kmn}\sum_{i=1}^{n}\sum_{j=1}^{m} \#\{SS_{ij}\},$$

where n is the total number of accounts, k is the number of testing authentication requests for each account, m is the number of impostors. $\#\{FR_i\}$ is the number of FR of the ith account, $\#\{FA_{ij}\}$ is the number of FA for ith account using the signals of jth account as the authentication requests, and $\#\{SSij\}$ is the number of successful spoof for the ith account by the jth impostor. Equal Error Rate (EER) is defined as the rate where FRR is equal to FAR. FAR10K and FAR100K denotes the FRR when FAR is $10^{-4}$ and $10^{-5}$, respectively. ZeroFAR denotes the FRR when FAR is zero. The decision threshold to change the amount of FR and FA is varied, and results are shown in the Receiver Operating Characteristic (ROC) curve in FIG. 8. The results are shown in Table I, with comparison to plain DTW method on the same dataset with the same signal preprocessing techniques using the same template. These evaluation metrics are widely used in traditional biometric authentication systems such as fingerprint. For comparison, the EER is mainly used since it is a single number that captures the general performance, and for practical usage, FAR1OK is more important.

TABLE I

EMPIRICAL RESULTS OF AUTHENTICATION

| Metric | EER | EER (spoof) | FAR 10K | FAR 100K | Zero FAR |
|---|---|---|---|---|---|
| Present System (glove) | 0.1% | 2.2% | 0.4% | 0.9% | 1.0% |
| DTW (glove) | 0.6% | 3.9% | 3.0% | 9.2% | 13.1% |
| Present system (camera) | 0.5% | 4.4% | 1.9% | 4.6% | 5.6% |
| DTW (camera) | 2.1% | 7.7% | 15.9% | 28.5% | 30.8% |

Compared with plain DTW algorithm which is used in many related works, the present method has a significant performance improvement. It is believed DTW is a good alignment algorithm but not necessarily a good matching algorithm. The present method treats different local distance with different importance and considers different segments of signal individually, while DTW uses a sum of element-wise distance that may propagate locally miss matched sample pair to the final result even for signals in the "true-user" class. Besides, DTW treats every segment of the signal equally, while some segments can be more distinctive for different strings, e.g., the second half is more important for the signals generated by writing "PASS-CODE" and "PASSWORD". In general the data obtained by the glove device has a higher consistency because it does not restrict the user to write in a certain area. Also the signal quality is better with the glove device, while signals with the camera device can contain missing samples or wrongly estimated hand postures. Hence, the present prototype with the glove device exhibits better performance.

Identification Experiments and Results

In the identification experiments, each individual string is considered as the ID associated to an account. Five signals are augmented to 125 signals at registration to train the CNN. The activation function used in the convolutional layer and fully-connected layers is a rectified linear unit (ReLU). The whole network is trained for 20 epochs with Adam algorithm with a learning rate of 0.001. A combination of cross-entropy loss and the center loss is used as the optimization target. The experiment procedures are as follows.

1) The registration process is followed to create all the accounts, train the CNN, construct the template and train the SVM ensemble.

2) Each s of the five testing signals of each account is used as an identification request and run the identification process. If s is from account A and the predicted account number is A, it is a correct identification; otherwise it is an incorrect identification.

3) Each s of the five spoofing signals in dataset 2 is used as an identification request. If s is a spoofing attack targeting account A and the predicted account number is A, it is a successful spoof; otherwise it is an unsuccessful spoof.

These experiments were run without the identity verification. In this case, if the s is a testing signal from account A or a spoofing attack targeting account A, and if the top-k candidate account numbers predicted by the CNN contains A, it is a correct identification or a successful spoof respectively.

Figure 9:
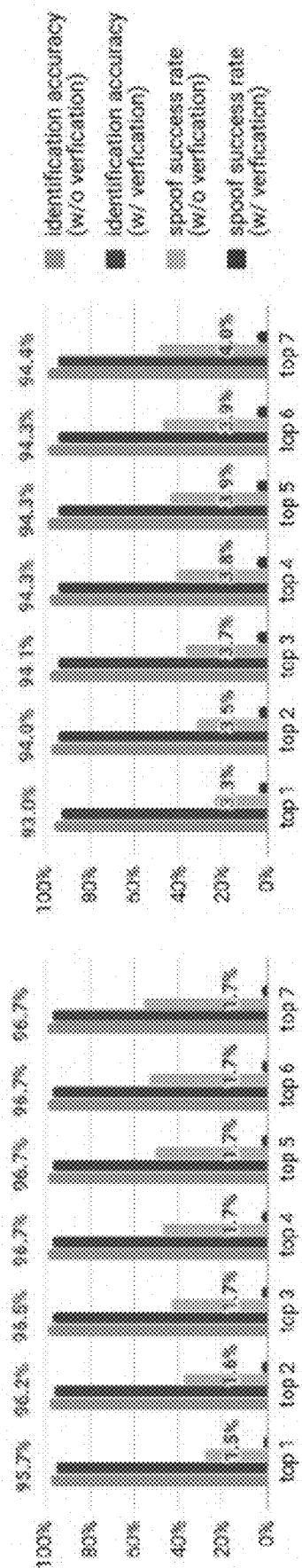
FIG. 9 shows graphical representations of the distribution performance with glove device and the camera device.

It is commonly believed that ID is not a secret and the identity verification should not be too strict to hurt usability. Thus, the threshold of the identity verification was chosen with a value that achieves the EER for spoofing only data. k is varied from 1 to 7 and the results are shown in FIG. 9.

In general, increasing the number of candidates helps identification accuracy, at a marginal cost of slightly increased spoof success rate. However, if identity verification is skipped, spoof success rate will have a significant increase, which renders the system vulnerable or even useless. The main cause is that the CNN learns features for distinguishing difference stroke combinations instead of distinguishing fine differences in the signal segments of the same stroke. Also in practice, there is no spoofing data available at registration time to train the CNN. Essentially, the CNN also serves as an index for all accounts in the database, which locates the probable accounts given a signal instead of search it exhaustively. With exhaustive search, the present system can achieve 99.9% accuracy with the glove device and 99.5% accuracy with the camera device. However, it takes more than one second to exhaustive search on a database containing about 200 accounts. The time consumption is mainly caused by accessing the stored template as well as aligning the signal, and it will grow linearly with the number of accounts in the database. More details on running time are shown in Appendix A.

Permanence Experiments and Results

The third dataset was used to study the long term performance of our prototype system by running the authentication procedure and the identification procedure for the five signals in each session. The change of authentication acceptance rate is shown in FIG. 10 (with the same setup as that in the authentication experiments described above, and a decision threshold at FAR=$10^{-4}$). The figure shows slight performance degradation with time. The template can be updated at the end of the session to prevent such degradation for future sessions. The new template is updated as an affine combination of the old template and the new signal, i.e., $\hat{t}_i \leftarrow (1-\lambda)\hat{t}_i + \lambda s_i$, where $\lambda$ is the update factor set to 0.1 in this experiment. Additionally, the template can be updated and the SVM classifiers can be retrained with both the old signals and new signals, which can further maintain or even improve performance.

The change of identification accuracy is shown in FIG. 11 (with the same setup as that in the identification experiments described above). The figure shows slight performance degradation with time. Similarly, the accuracy can be improved significantly if the CNN and the SVM classifiers are both retrained with the new signals at the end of the session. It is believed that for some users a mere 5 signals at registration cannot fully capture the uncertainty of the writing behavior, even with data augmentation methods. In practice, typing a password can always be employed as a fallback. On a smartphone, if the user does not unlock it immediately with fingerprint or face, the smartphone will ask the user to type a password. If the password passes, it will update the fingerprint or face template accordingly. Such a strategy can also be utilized in the present framework since showing a virtual keyboard to type a password can always be a backup option, though it is inconvenient.

Comparison to Existing Works

A comparison to existing works which also use in-air-handwriting is shown in the Table II. The major characteristics that differentiate the present framework from them are as follows. First, the present framework uses a data driven method by designing features and utilizing machine learning models, instead of crafting algorithms calculating a matching distance for authentication. Second, the present framework avoids exhaustively searching and comparing the whole account database for user identification. Third, performance of the present framework is evaluated under active spoofing attacks and with a time span of near a month, which is usually omitted by existing works. Fourth, the present framework has a significant performance improvement on a dataset with reasonable size.

Comparison to Password and Other Biometrics

In Table III, a comparison is presented of the present framework with password and biometrics based system. The results shown here are obtained from different publications with various datasets, which merely show limited information as an intuition about their performance, instead of the performance with serious and strongly supervised evaluation. First, the classification accuracy is shown in terms of EER. Here the present framework is comparable to fingerprint (on FVC2004 among all the datasets), face, iris, and signature. In comparison to biometrics, a considerable portion of discrimination capability comes from the large content space of the in-air-handwriting. Next the equivalent key space is shown in number of bits. For a password used in unlocking a device, the commonly used 4-digit password (default setting on most smartphone) are considered, and for biometrics, the equivalent key space is defined by $\log_2(1/\text{FAR})$. The present framework calculates key space with the corresponding FAR by setting the decision threshold at a place where the true user has 95% successful login rate (i.e., 5% FRR). The results show that the present system is also comparable to password based login and authentication system. Due to the limited amount of data, a FAR resolution lower than $5\times10^{-6}$, i.e., more than 17.6 bit key space cannot be achieved. For the glove device, at the 5% FRR decision threshold, the FAR is already 0 but it can only be concluded that the equivalent key space is larger than 17.6 bits. In practice, a recommended password key space is between 28 to 128 bits while web users typically choose passwords with 20 to 90 bits key space and on average it is 40 to 41 bits. However such large key space is underutilized because it is well-known that most people are not good at creating and memorizing strong password, and the actual entropy is much less than that of the whole key space. Moreover, since passwords must contain letters that can be typed on keyboard, efficient password guessing strategies such as a dictionary attack further weaken the calculated password quality in number of bits. A more detailed analysis on the comparison of usability, deployability, and security with password and biometrics is provided in Appendix B.

User Evaluation

Figure 12:
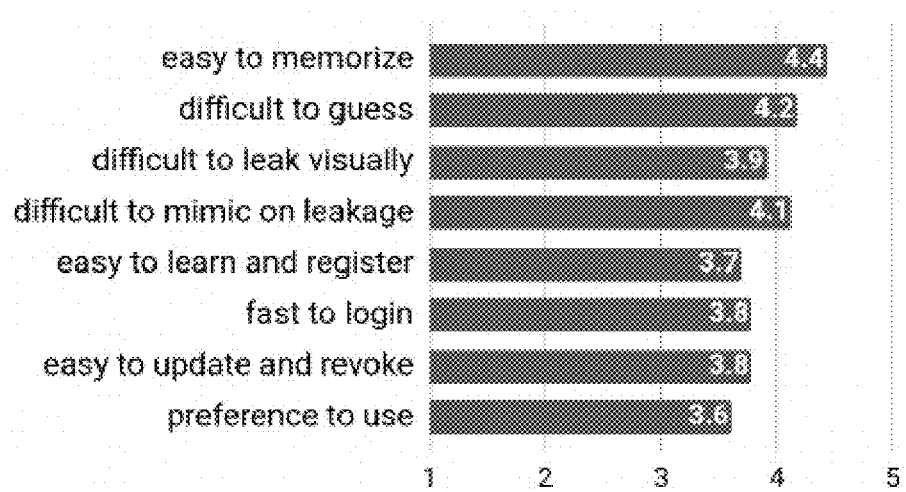
FIG. 12 is a graphical representation of a user evaluation scores.

The usability of the present framework was investigated by taking questionnaires from 30 users with the experience of both the glove device and the camera device. First, the users evaluate various aspects of the present in-air-handwriting based login framework with a score from 1 (strongly disagree) to 5 (strongly agree). The results are shown in FIG. 12.

Figure 13:
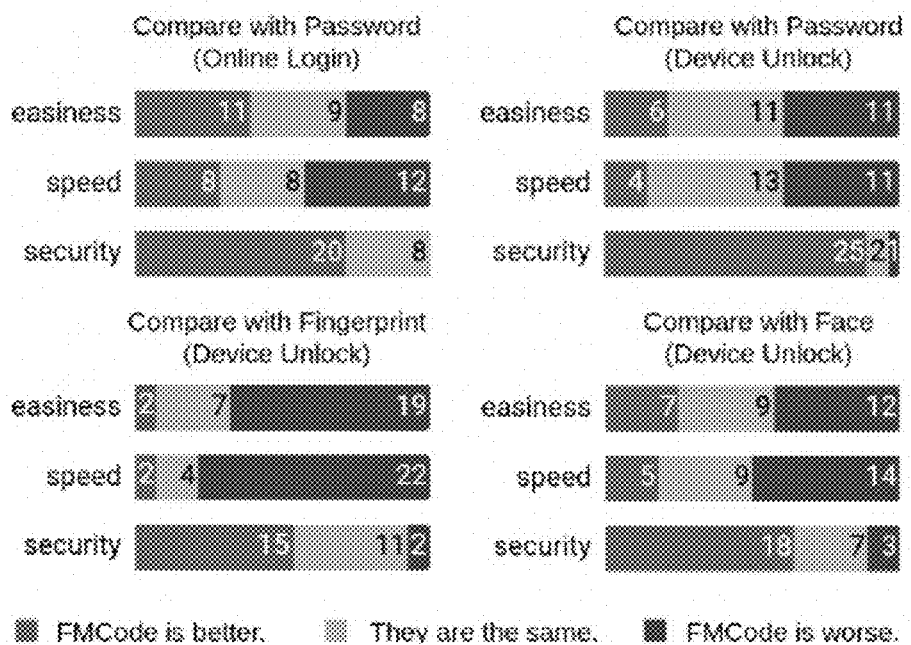
FIG. 13 shows graphical representations illustration user evaluation and comparison.

Second, the user was asked to compare the present framework with the password based systems and biometrics including fingerprint and face, on the easiness of usage, login speed and security. The user has three options: (a) the present framework is better, (b) they are the same or difficult to decide which one is better or worse, (c) our framework is worse. The results are shown in FIG. 13. It is shown that the users tend to have a mixed attitude on the usability compared to traditional password. However, the majority of the users feel that the present framework is more secure than traditional password, and more than half of them feel it is more secure than fingerprint and face.

Third, the following questions were asked:
1) Compared to a password, the present framework fuses handwriting conventions. Is this characteristic important?
2) Compared to biometrics, the present framework allows revocation of the gesture passcode, which is unlinked to personal identity. Is this characteristic important?

Among the surveyed users, 89% and 82% of them answered "important" for the first and second characteristics respectively. Combined with the previous results, it can be concluded that the present framework does not intend to replace existing password-based solution or biometrics. Instead, due to its unique characteristics that passwords and biometrics lack, the present framework is suitable in scenarios where such characteristics matter and where passwords and biometrics are not applicable, for example, login over gesture interface on VR headset or in operating theater.

TABLE II

COMPARISON TO EXISTING WORKS.

| Ref. | dataset size | EER (w/o spoof) | EER (w/ spoof) | Identification Accuracy | Device | Algorithm |
|---|---|---|---|---|---|---|
| FMCode (glove) | 105 (210) | 0.1% | 2.2% | 96.7% (99.9%) | glove | SVM/CNN |
| FMCode (camera) | 109 (218) | 0.5% | 4.4% | 94.3% (99.5%) | Leap Motion | SVM/CNN |
| Liu et al. | 20~25 | ~3% | ~10% | 88~98.4% | Wii remote | DTW |
| Bailador et al. | 96 | 1.8%~2.1% | ~5% | N/A | Smartphone | DTW, Bayes, FLMM |
| Bashir et al. | 40 | ~1.8% | N/A | 98.5% | custom digital pen | DTW |
| Chan et al. | 16 | 0.8% | N/A | 98% | Leap Motion | random forest |
| Tian et al. | 18 | ~2% | N/A | N/A | Kinect | DTW |

TABLE III

COMPARISON TO PASSWORD AND BIOMETRICS.

| metric | FMCode (glove) | FMCode (camera) | Password (online login) | Password (device unlock) | Fingerprint | Face | Iris | Signature |
|---|---|---|---|---|---|---|---|---|
| EER (w/o spoof) | 0.1% | 0.5% | N/A | N/A | 0.28%~2% [29] | 2.6%~8.6% [37] | 0.11% [32] | 1%~3% [38] |
| Key Space (bits) | >17.6 | 16 | 20~90 [34] | 13.3 | 13.3 [32] | N/A | 19.9 [32] | N/A |

At last, the user is asked which type of device is preferred between a wearable device and a contactless device for hand motion tracking. 21% of the users choose the wearable device and the other 79% choose the contactless device.

Cost of Computing and Storage

The present framework was implemented in Python with sklearn library and TensorFlow. Preprocessing a single signal cost about 25 ms for the glove device (excluding the state estimation step since it is running on the device instead of the client machine) and 100 ms for the camera device, where filtering is the bottleneck. In authentication, generate template cost 2.1 ms and training the SVM cost 30 ms for each account; classification of each signal cost less than 1 ms, which is negligible compared to the time for writing the string. The time consumption measured here does not contain loading the data and model from disk to the main memory, because the disk speed varies significantly due to the page cache in the main memory and our dataset is small enough to be fully fit in the cache, which is quite different when used in real world scenarios. This measurement is conducted with a single threaded program on a workstation with Intel Xeon E3-1230 CPU (quad-core 3.2 GHz, 8M cache) and 32 GB main memory. For identification, training the deep CNN for 20 epochs requires around 7 minutes using only CPU, while with a powerful GPU (Nvida GTX 1080 Ti in our case) this can drastically decrease to around 30 seconds; classification using the CNN costs less than 1 ms with only CPU. The space cost for template storage and the amount of data needed to be transferred between the server and the client is proportional to the signal length. If each sensor axis of a sample is represented in single precision floating point number (four bytes), the average space cost of a signal is 8.6 KB with our datasets for both devices (they both output data with 9 sensor axis). If all parameters are represented in single precision floating point number, storing the SVM classifiers costs 79 KB per account on average, and storing the CNN itself requires around 4 MB because of the 1 million weights and biases parameters.

Comparison to Password and Biometrics in Usability, Deployability and Security

The usability, deployability and security of the present framework were evaluated using the known criteria, and the result is shown in Table IV. Two aspects in deployability were added to the present framework—"configurable" and "developer friendly". Each usability, deployability and security item is evaluated by whether the present framework method possesses the characteristics, and a plus/minus sign means that our method is better/worse than password. In general, compared with password and biometrics, the present framework achieves nearly all their usability and deployability characteristics, and it contains the security advantages from both password and biometrics.

On the usability side, nothing to carry means the user does not to present a physical item such as a card. Though the present system uses a glove, the glove is treated as a general gesture input device, just like how using a password-based login system does not require the user to bring a keyboard everywhere. Arguably, the present system has less of a memory burden because the discrimination capability comes from 3 layers of information rather than a combination of characters in a password. As a result, a memorable gesture passcode is not necessarily weak. However, there might potentially be more frequent rejection of legitimate user login attempts than with traditional password frameworks because the internal fluctuation in the stability of finger motion.

On the deployability side, since the server only needs to store the template as a secret, the present system is similar as those behavior biometrics without using special devices (e.g., keyboard or mouse dynamics), thus it can be compatible with most server with small software modification. The present system can be supported by browsers on devices with gesture input interface, where the gesture passcode input of a user can be treated as a very long password and sent to the server over the Internet, similar as the case of logging into a website using password.

TABLE IV

USABILITY, DEPLOYABILITY, AND SECURITY EVALUATION OF FMCODE.

| Usability | FMCode | Deployability | FMCode | Security | FMCode |
|---|---|---|---|---|---|
| Memory effortless | Maybe (+) | Accessible | Yes | Resilient to physical observation | Yes (+) |
| Scalable for users | Maybe (+) | Scalable | Yes | Resilient to targeted impersonation | Maybe (+) |
| Nothing to carry | Yes | Server compatible | Maybe (−) | Resilient to throttled guessing | Maybe |
| Physically effortless | No | Browser compatible | Maybe (−) | Resilient to unthrottled guessing | No |
| Easy to learn | Yes | Mature | No (−) | Resilient to theft | Yes (+) |
| Efficient to use | Yes | Non-proprietary | Yes | No trusted third party required | Yes |
| Infrequent errors | Maybe (−) | Configurable [63] | Yes | Requiring explicit consent | Yes |
| Easy to recovery | Yes | Developer friendly[63] | Yes | Unlinkable | Yes |

On the security side, the present system can withstand spoof under semantic or visual disclosure and targeted impersonation to a certain extent, which is more like biometrics than password. But unlike passive biometrics, a gesture passcode is changeable and more difficult to steal. For example, an attacker can collect a user's fingerprint from a cup after the user has touched it, but the gesture passcode can only be recorded when the user performs it. The present system may suffer from server storage leakage and internal observer if the template is not properly protected, and such proper template protection might be difficult because of fussiness in alignment and matching. Also, the present system shares all other security deficiencies of password and biometrics under attacks such as brute-force guessing/collision, dictionary guessing, phishing and cross-site leakage.

Compared with traditional password, the present system uses handwriting, which makes it a behavior biometrics, and this provides certain protection under semantic or visual disclosure of the passcode. On the other side, compared with unchangeable biometrics like fingerprint, the present system keeps most of the advantages of a password such as revocability and privacy preserving. This also allows one user to have more than one gesture passcode, which is different from traditional behavior biometrics like gait or voice in active speaker recognition. The most similar authentication techniques would be online signature verification (technically speaking, handwriting verification), or graphical password with stroke dynamics, but most of they assume a 2D pressure sensitive touchscreen instead of writing in the air.

Discussion—Other Attacks

There are other potential attacks on the present authentication system if some of the aforementioned security assumptions do not hold. For example, the attacker may be able to access the server's storage to steal the templates. Due to the inherent fuzziness in the authentication step, traditional hash is not able to protect the templates like a hashed password might. One possible solution that is being worked on is adapting the deep CNN to generate a fuzzy hash and further a set of keys for each account using the signals at registration. The templates can be encrypted by each of the key to form a pool. At login time, the same neural network is applied on the signal in the login request to obtain a fuzzy hash and a key. It is highly possible that this key can decrypt an encrypted template in the pool, if the signal is generated by the legitimate user performing the correct gesture passcode. After the template decryption, the authentication procedure can continue. If the templates can be successfully decrypted by the generated key from the signal in the login request, it cannot be concluded that the user is authenticated. As shown in the identification results, the ID is easier to spoof without a verification step, thus an impostor with the knowledge of the ID and the passcode may also be able to derive an acceptable key. However, the attacker that steals the templates does not have such knowledge.

Another possible threat is man-in-the-middle attacks, where the attacker intercepts and records the messages

TABLE V

COMPARISON OF EXPERIMENTAL RESULTS AND ALGORITHMS OF RELATED WORKS.

| Related Works | # of subjects | Device | Experiment Timespan | EER | Claimed Accuracy | Motion Gesture | Algorithm |
|---|---|---|---|---|---|---|---|
| Patel et al.[44] | NA | Cellphone w/ accelerometer | NA | NA | NA | shake | static threshold |
| Okumura et al.[45] | 12~22 | Cellphone w/ accelerometer | 6 weeks | 4% | NA | shake | DTW |
| Mayrhofer et al.[46] | 51 | Custom device w/accelerometer | NA | ~2%, 10% | NA | shake | frequency coherence |
| Farella et al.[49] | 5~10 | PDA w/ accelerometer | NA | NA | 63%~97% | 4 specified gestures | PCA/LLE + kNN |
| Lester et al.[48] | 6 | Custom, device w/accelerometer | NA | NA | 100% | walk | frequency coherence |
| Gafurov et al.[47] | 30 | Custom, device w/accelerometer | NA | 10% | NA | walk | frequency similarity |
| Liu e al.[6] | 20~25 | Nintendo Wii remote | 1~4 weeks | ~3%, >10% | NA | free writing | DTW |
| Zaharis et al.[7] | 4 | Nintendo Wii remote | 3 weeks | NA | 98.20% | free writing | statistical feature matching |
| Casanova et al.[5] | 96 | Smartphone | 20 days | ~2.5% | NA | free writing | DTW, Bayes, HMM |
| Lee et al.[64] | 15 | Smartphone | NA | NA | 88.40% | tap, flip, etc. | decision tree |
| Bashir et al.[36] | 10~40 | Custom pen | NA | ~1.8% | 98.50% | alphabetic or free writing | RDTW |
| Renuka et al.[61] | 12 | Custom pen | NA | NA | ~95% | alphabetic or free writing | NA |
| Aslan, et al.[54] | 13 | Leap Motion | NA | ~10% | NA | 2 specified gestures | DTW |
| Nigam et al.[10] | 150 | Leap Motion | NA | NA | 81% | free writing | statistical feature classification |
| Chan et al.[9] | 16 | Leap Motion | NA | 0.80% | >99% | free writing | random forest |
| Piekarczyk et al.[55] | 4~5 | Leap Motion | NA | NA | 88%~100% | 4 specified gestures | DCT + DTW + kNN/LSH |
| Tian et al.[11] | 18 | Kinect | 5 months | ~2% | NA | free writing | DTW |
| Sajid et al.[8] | 10 | Google Glass | NA | NA | 97.50% | free writing | PCA + GMM Clustering + DTW |
| Wu et al.[52] | 20 | Kinect | NA | 1.89% | NA | 8 gestures | DTW |
| Hayashi et al.[53] | 36 | Kinect | 2 weeks | 0.5%~1.6% | NA | hand waving | SVM | between the server and the client. It is believed this is not critical because machine-to-machine authentication and message encryption can be used first to allow the client and the server to communicate securely. Existing technologies such as SSL/TLS and public key infrastructure (PKI) over the Internet can be leveraged to build a secure communication channel before user login, similar to the case of password-based login on most websites over the Internet nowadays.

On the user side, record and replay attacks must also be handled. The authentication request is required to present a multidimensional signal about the physical states of the hand during the writing. In a preliminary experiment, it was found to be difficult to synthesize such a signal from a video recorded by monolens camera or depth camera placed 1 meter away from the user. The main reason is the drastic spatial resolution drop with distance, which cause limited hand skeleton estimation accuracy. A secondary reason is the posture uncertainty of the user and the motion blur due to insufficient frame rate of the camera. If the camera is close to the user, the user might be alerted, just like if someone within close proximity is watching a user typing his or her password, the user will be alerted and stop typing. More details about this type of attack will be presented in future work.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system for identifying and authenticating a user using a gesture interface, the system comprising:
    a motion capture device in operative communication with a client-side processor, the client-side processor being configured to execute instructions including:
        representing a raw gesture signal captured by the motion capture device as a vector series of individual samples, wherein each of the individual samples comprises a multi-dimensional sample vector; and
        pre-processing the raw gesture signal to obtain a normalized gesture signal;
    wherein the normalized gesture signal comprises an ID gesture signal or a passcode gesture signal;
    and
    a login server in operative communication with a convolutional neural network and a plurality of binary classifiers, the login server being configured to execute instructions including:
        identifying a user using the convolutional neural network and the plurality of binary classifiers to map the ID gesture signal obtained by the motion capture device to a corresponding account number; and
        authenticating a user using the convolutional neural network and the plurality of binary classifiers to compare the passcode gesture signal with a passcode template and accept or reject an authentication request associated with the passcode gesture signal.

2. The system of claim 1, wherein the motion capture device comprises a glove equipped with one or more inertial sensors.

3. The system of claim 2, wherein an absolute orientation of an index finger of the glove is derived relative to a starting position.

4. The system of claim 1, wherein the motion capture device comprises a 3D camera.

5. The system of claim 4, wherein a velocity and an acceleration of a hand captured by the 3D camera are derived from a position difference, wherein the position difference is derived using a position trajectory and a posture estimated by a plurality of depth image frames of the 3D camera.

6. The system of claim 1, wherein the convolutional neural network comprises:
    a first and second convolutional pooling layer configured for individually detecting local features of the gesture signal using depthwise convolution;
    a third, fourth and fifth convolutional pooling layer configured for constructing high level features from the local features using separable convolution;
    a fully connected layer configured for classifying the high level features and generating a set of embedding vectors; and
    a softmax layer configured for mapping the set of embedding vectors to a probability distribution of accounts;
    wherein one or more candidate accounts having high probabilities are selected from the probability distribution of accounts.

7. The system of claim 1, wherein a signal template is developed at an account registration by performing a gesture multiple times such that the gesture is captured by the motion capture device, wherein the signal template corresponds to the ID gesture signal or to the passcode gesture signal obtained at the account registration.

8. The system of claim 7, further comprising:
    training the convolutional neural network at the account registration using an augmented registration dataset, wherein the augmented registration dataset is obtained by:
        forming a new set of aligned signal templates for every signal template obtained at the account registration;
        exchanging a random segment between a pair of randomly chosen aligned signal templates to obtain a pair of new signal templates for each pair of randomly chosen aligned signals;
        augmenting each new template signal; and
        applying dropout to a fully-connected layer of the convolutional neural network.

9. The system of claim 7, wherein each of the plurality of binary classifiers comprises a support vector machine.

10. The system of claim 9, wherein the login server builds the plurality of binary classifiers for an account upon registration.

11. The system of claim 10, further comprising:
    training each of the plurality of binary classifiers upon registration, wherein training the binary classifiers comprises:
        randomly choosing a plurality of windows for each of the plurality of binary classifiers;
        assigning a true user label to a set of feature vectors extracted from the normalized gesture signals obtained upon registration;
        assigning a false user label to a set of feature vectors extracted from a plurality of gesture signals associated with other accounts; and
        applying sequential minimal optimization to each binary classifier using the sets of feature vectors, the true user labels and the false user labels.

12. The system of claim 1, wherein a plurality of feature vectors are extracted for each normalized gesture signal and a corresponding gesture template and wherein the feature vectors are communicated as input to the plurality of binary classifiers.

13. The system of claim 1, wherein local samples of the normalized gesture signal are grouped into segments, wherein the segments roughly map to a stroke and wherein segments of the normalized gesture signal are compared with segments of a gesture template.

14. A method for identifying a user using a gesture interface, comprising:
pre-processing a raw ID signal obtained by a motion capture device to obtain a normalized ID signal;
obtaining one or more candidate account numbers which are potentially associated with the normalized ID signal using a convolutional neural network;
comparing an ID signal template associated with each candidate account number with the normalized ID signal using a plurality of binary classifiers; and
returning a best matched account number associated with the normalized ID signal.

15. The method of claim 14, wherein pre-processing a raw ID signal further comprises:
deriving a plurality of indirect dynamic states from the raw ID signal;
estimating any missing raw ID signal samples;
trimming the raw ID signal;
removing high frequency components of the trimmed ID signal using a low pass filter;
resampling the filtered ID signal;
translating a coordinate system associated with the filtered ID signal such that an X axis of the coordinate system corresponds to an average pointing direction of a user's hand; and
normalizing an amplitude of the filtered ID signal to obtain a normalized ID signal;
wherein pre-processing the ID signal is performed by a client-side processor.

16. The method of claim 14, wherein comparing an ID signal template associated with each candidate account number with the normalized ID signal using a plurality of binary classifier further comprises:
extracting one or more feature vectors associated with the normalized ID signal;
assigning a set of scores to the normalized ID signal by processing each of the one or more feature vectors using one of a plurality of binary classifiers;
averaging the set of scores into a singular average score; and
comparing the singular average score with a pre-determined threshold value to accept or deny the candidate account obtained by the convolutional neural network.

17. The method of claim 14, further comprising:
extending the normalized gesture signal to a fixed length of 256 elements using linear interpolation prior to being communicated as input to the convolutional neural network.

18. A method for authenticating a user using a gesture interface, comprising:
pre-processing a raw passcode gesture signal obtained by a gesture interface to obtain a normalized passcode gesture signal;
extracting a feature vector associated with the normalized passcode gesture signal;
assigning a score to the passcode gesture signal by processing the feature vector using one of a plurality of binary classifiers; and
comparing the score with a pre-determined threshold value to accept or deny an authentication request associated with the passcode gesture signal.

19. The method of claim 18, wherein pre-processing a raw passcode gesture signal further comprises:
deriving a plurality of indirect dynamic states from the raw passcode gesture signal;
estimating any missing raw passcode gesture signal samples;
trimming the raw passcode gesture signal;
removing high frequency components of the trimmed passcode gesture signal using a low pass filter;
re-sampling the filtered passcode gesture signal;
translating a coordinate system associated with the filtered passcode gesture signal such that an X axis of the coordinate system corresponds to an average pointing direction of a user's hand; and
normalizing an amplitude of the filtered passcode gesture signal to obtain a normalized passcode gesture signal;
wherein the step of pre-processing the passcode gesture signal is performed by a client-side processor.

20. The method of claim 18, wherein extracting a feature vector further comprises:
aligning the normalized passcode gesture signal with a passcode template using dynamic time warping such that a length of the aligned passcode gesture signal is the same length as the passcode template;
obtaining a distance vector between the aligned passcode gesture signal and the passcode template;
segmenting the distance vector into a plurality of local windows; and
forming a temporal local distance feature vector from the distance vectors expressed in each of the plurality of randomly chosen local windows.

* * * * *